May 4, 1943. A. L. HANN 2,318,309
DEVICE FOR REFRIGERATING BEVERAGES
Filed Feb. 10, 1939
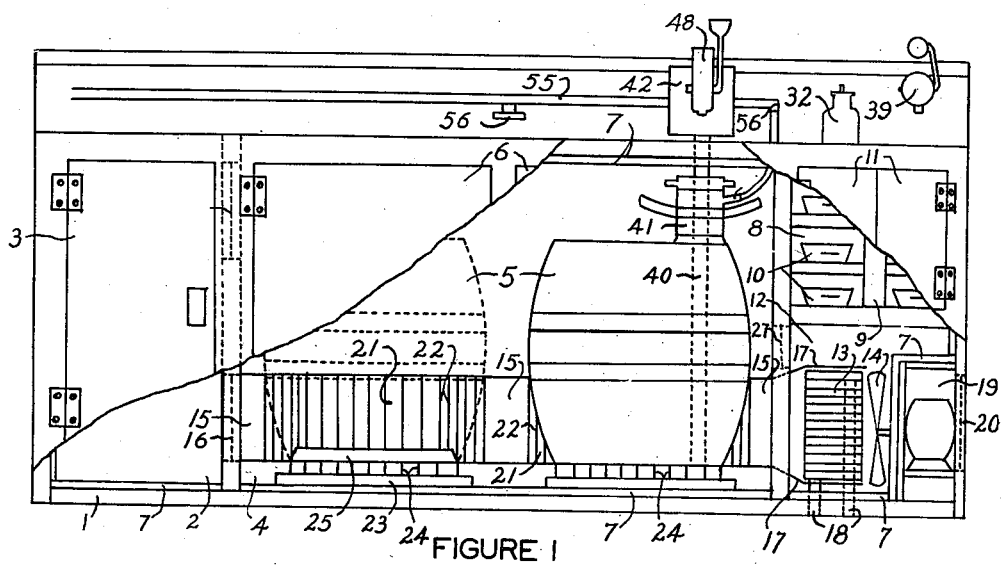
FIGURE I
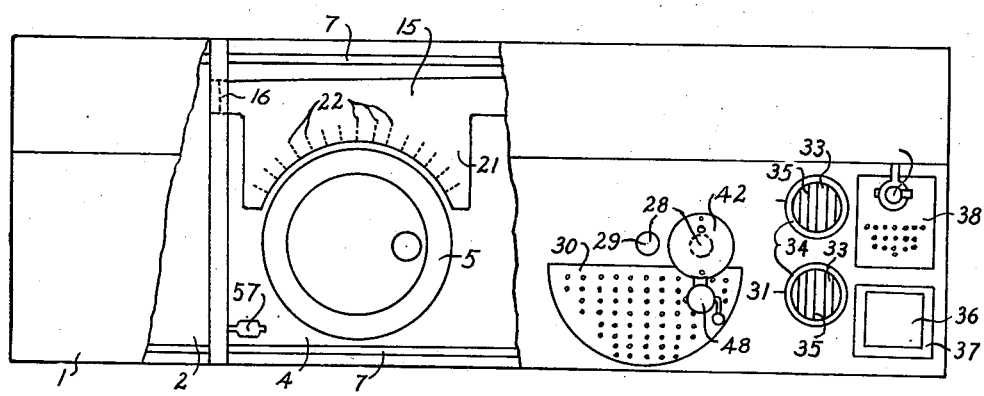
FIGURE II
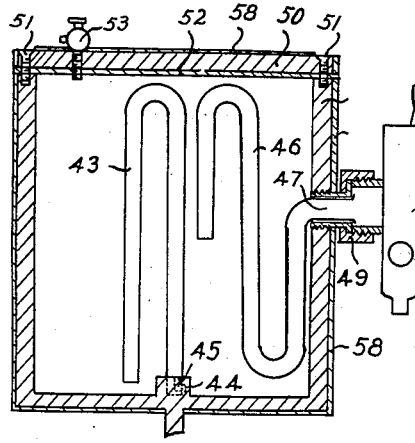
FIGURE III
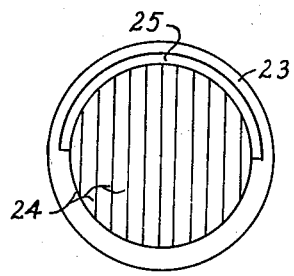
FIGURE IV
Alan L. Hann
INVENTOR
BY Norman N. Popper
ATTORNEY Patented May 4, 1943

2,318,309

UNITED STATES PATENT OFFICE 2,318,309

DEVICE FOR REFRIGERATING BEVERAGES

Alan L. Hann, Newark, N. J.

Application February 10, 1939, Serial No. 255,711

2 Claims. (Cl. 62—141)

My invention relates to devices and methods of dispensing and conditioning beverages, particularly to beverages having a gaseous content, which must be preserved until they are dispensed for consumption, and which must be served cooled to a proper temperature. More specifically, my invention relates to apparatus and methods of dispensing and conditioning beer and other similar beverages.

The metallic barrel, especially the aluminum barrel, is coming into common use and threatens to replace entirely the wooden barrel. It cannot be doubted that in the future there will arise further improvements in barrels in the form of glass barrels, plastic barrels, or barrels of other composition. Little or no advantage has been taken of the fact that the metallic barrel is an excellent conductor of heat, and this is especially true of the aluminum barrel, and by reason of that quality, it may take a more prominent part in the conditioning of its contents.

Methods and devices for dispensing beer and other beverages frequently involve expensive accessories and a multiplicity of parts that are subject to falling into disrepair, or need frequent cleaning or replacement by reason of the fact that they either accumulate foreign matter which will be deleterious and impair the flavor of the beverage, or lay the foundation for germ, fungus and other growths, which also impair the flavor of the beverage.

Other methods and devices for dispensing beverages consist of apparatus which suddenly introduce a refrigerant at extreme temperatures, which causes clouding or an impairment of flavor and quality by reason of the wide disparity of temperatures. Other methods and devices for dispensing beverages frequently effect the deliverance of a flat beverage or a wild or overly effervescent beverage.

Other methods and devices for dispensing beverages consist of apparatus for cooling the beverage by cooling the surface of the conventional wooden barrel container with liquid refrigerants. This and similar methods are unsatisfactory in operation because the wooden barrel is a comparatively poor conductor of heat and its part in the refrigerative process is a wasteful one and takes a long time. The liquid refrigerant, whether used with wooden barrels or metal barrels, has a tendency to wash off the dust, splinters, dirt and other foreign matter that may have adhered to the surface of the barrel during the course of transportation, and thus, increases the possibility of contamination of the contained beverage and making the whole refrigerative device unsanitary in operation. In addition, such foreign matter tends to accumulate, foul, and clog the system as well as causing corrosion of many metal parts. A still further disadvantage of such a system is that the liquid refrigerant being of an extremely low temperature will produce a very sudden and unequal chilling tending to freeze the beverage in its immediate vicinity or if not that, at least cause precipitation or clouding, and an impairment of flavor and quality.

Among the present invention's objects is complete economy of operation, as well as economy of costs, installation and up-keep by reason of a minimum of material accessories and a minimum of parts that will need to be replaced after usage. In the present invention no cooling apparatus becomes a permanent part of the barrel. Cooling takes place without introducing, within the barrel, any apparatus or refrigerant.

Another object is to provide a specially designed beverage chamber that will accommodate the cool beverage immediately before it is drawn and will minimize the possibility of separation of the gaseous content of the same, although it should be noted that such a beverage chamber is not an absolute necessity for use with inventor's cooling system.

Another object is to eliminate large coil installations which require frequent cleaning and tend to collect dirt, sediment, germs, or fungi, which tend to contaminate. Another object is to eliminate the transfer of beverages from the transportation container to tanks or extensive coils for purposes of cooling. Another object is to provide a method of dispensing, whereby the danger of souring or contamination is minimized. Another object is to provide a method of dispensing whereby the "head" of the malt beverage may be controlled. Another object is to provide a method and a device for dispensing beverages whereby they are brought to a proper temperature for consumption and whereby they may be maintained at that proper temperature.

The outstanding feature of this invention is the utilization of the heat transmitting properties of the new type transportation container whereby the beverage within it is cooled without introducing within the container any apparatus or refrigerant. A secondary, yet outstanding feature, is the beverage chamber designed to prevent separation of the gaseous content of the beer.

Referring now to the drawing:

Figure I is a view of the front of the bar with the front wall broken away.

Figure II is a top view with the bar and top broken away.

Figure III is a cross-section of the beverage chamber.

Figure IV is a top view of the water tray and supporting bars.

Referring now to the figures, the device consists of a bar in cabinet form 1. It is completely closed on the service side by a series of doors and the inside is divided into compartments. A storage compartment 2 serves to provide a place for bottled goods and such other articles which it may be desired to keep cool. A door 3 provides convenient access to the contents of the compartment 2. Shelves preferably of open wire mesh structure or of spaced bars may be provided within the storage compartment for the articles to be kept therein to rest upon and also to permit the free circulation of the refrigerated air. A cooling compartment 4 in the center of the bar is provided with a plurality of spaces, as many as may be desired for the beverage transportation containers 5. An appropriate number of doors 6 serve to admit the transportation containers 5 to the cooling compartment 4. The cabinet's outer walls in each of these compartments, and also the doors, are covered with a heat insulating material 7. Another compartment 8 serves to accommodate a frost coil 9 and trays 10 of water in which ice cubes may be made. Appropriate doors 11 serve to give access to this compartment. Immediately beneath this compartment, as shown in Figure I, is the blower compartment 12 which serves to accommodate a grid-cooler unit 13 and a motor driven blower fan 14 adapted to force a current of air through the grids of the cooling unit 13. Connecting this blower compartment 12 with the cooling compartment 4 and the storage compartment 2 is an air duct 15. A grille 16 may be provided at the point where the duct enters the storage compartment, which grille will serve the dual purpose of more equally distributing the flow of refrigerated air out of the duct and also will prevent articles in the storage compartment from entering the duct. At the entrance to the duct 15 in the blower compartment the grid-unit cooler 13 is located and is surrounded by a shield 17 or air guide adapted to force the refrigerated air to pass between the grids. The refrigerant in the grid-unit cooler is introduced and let out by pipes 18 connecting it to a conveniently located compressor unit. If desired, the bar may be enlarged to provide a separate compartment for such compressor unit. The air is activated by the blower fan 14. The motor driving the blower fan is located in a separate compartment 19 made of heat insulating material and provided with a vent 20 to allow the heat generated by the motor to be carried off outside the bar.

The duct 15 connecting the blower compartment with the storage compartment is provided with a plurality of outlets 21 in the cooling compartment for each beverage container position. The outlet is formed as appears in Figure II and such is its preferred form. A series of fins 22 provides a more or less uniform convection of the air passing through the duct and serve to throw such air toward the lower portion and under the transporatation container 5, which portions are the points from which the beverage is first drawn. The width of the duct is decreased as it progresses from the blower compartment to the storage compartment as appears in Figure II. The transportation containers 5 themselves are positioned over a tray 23 of appropriate size, which tray is adapted to be filled with water. A series of transverse bars 24 serve to support the container a brief distance above the surface of the water and also to allow for the ready passage of refrigerated air beneath the containers 5. Above the supporting bars 24, so as not to interfere with the passage of the air beneath the container, a retaining lip 25 serves to position the transportation container properly on the bars 24 and above the tray 23, and to prevent the container from slipping off the back of the tray and damaging the fins 22 or the duct 15 structure, as shown in Figure IV. The air that is blown into the storage compartment 2 is permitted to escape into the cooling chamber by a grille 26 and returns to the blower compartment through another grille 27 located immediately above the grid-unit cooler shield 17. The top of the bar, as shown in Figure II, has two holes 28 over each container positioned to accommodate the tap rod depending on where the tap hole is in the top of the container. When not in use these vents are closed by appropriate plugs 29. A recess accommodates a semi-circular catch-pan 30, which collects the overflow from glasses. In the ice cube compartment, two recesses 31 in the top of the bar serve to hold bottles 32 in which it is desired to keep cool the mixing ingredients. To prevent the free circulation of air into the cube compartment through these recesses, a cylindrical plug 33, preferably of metal, fits into the recess and is retained there by a lip 34 or collar to prevent it from sliding entirely into the cube compartment. The bottom of this cylindrical plug being closed, is provided with a series of transverse bars 35 or ridges for the bottles to rest upon. A tray 36 is also provided for ice cubes kept on top of the bar for immediate use, which tray is kept in position and prevented from slipping into the ice cube compartment by a lip 37 similar to that on the cylindrical plug. A sink 38 is also provided immediately below a carbonated water faucet 39. The carbonated beverage line may be introduced through the cube freezing compartment 8 so that the supply of carbonated water will always be properly cooled. The tap rod 40 is introduced through the vent in the top of the bar and is inserted through the tap 41. The tap rod 40 is connected at its top point with a beverage conditioning chamber 42, shown in Figure III, into which the beverage is introduced by a tube 43 which first rises to the top of the chamber and then descends to the bottom of the chamber where the beverage is emitted. This tube 43 is inserted into the bottom of the chamber and held in place by a pin 44 inserted in a slot 45. The beverage is conducted out of the chamber by a tube 46 commencing at about the mid-point of the chamber, and then rising to the top of the chamber 42 whence it descends to the bottom, and then conducts the beverage out of the chamber at the outlet 47. A faucet 48 of conventional type is connected to this outlet tube by a union 49 or connection of any desirable type. The top of the chamber is a lid 50 which may be held in place by screws 51 to make the chamber fluid and gas tight. A washer 52 of suitable composition may be also used. A layer of heat insulating material 58 may be applied to the chamber 42. A valve 53 provides means for disposing of gas accumulations that may have been separated from the beverage. The system may be operated under as high a pressure as desirable, such pressure being applied through the appropriate connection 54 on the tap. Pressure lines 55 may be run along the front wall of the bar and provided with suitable outlets 56 at convenient intervals. The temperature within the cooling chamber is controlled by a thermostatic device 57, serving to turn on and off the blower fan motor in accordance with the variations of temperature.

The operation of the device is as follows:

The trays 23 are first filled with water. After the device has been in operation for a short time, the water in the trays freezes, thus supplying constant sources of cooling in immediate proximity to the transportation containers 5, particularly in the regions from which the beverage is drawn. Upon delivery of a container, it is placed within the bar or cabinet over the water tray 23 so that it rests on the transverse bars 24 over the tray. The collar or lip 25 acts as a guide for properly positioning the transportation container and to prevent it from sliding up against and damaging the duct outlet 21. The collar, being confined to the space above the bars, permits free circulation of air not only around the transportation container, but also under it. The thermostatic control 57 operates when the temperature in the cabinet rises too high. It, of course, may be set for any desired temperature. Assuming it has been set for the optimum temperature and the motor circuit is activated by it, the fan 14 commences to revolve and forces a current of air through the grids of the cooler unit 13 which is connected to a conventional condenser unit. The air courses through the duct 15 and out the several outlets 21 imparting its cooling effect to the transportation containers 5, which in turn, transmit it to the beverage they contain. The duct narrows in width as it approaches the storage compartment, as indicated in Figure II. The tap 41 is attached to the top of the transportation container when the beverage has been brought to the proper temperature for consumption. The tap rod 40 is inserted through the hole in the top of the bar, through the tap and into the barrel; the pressure line 55 is attached to the tap. The beverage will rise through the rod into the entrance tube 43 of the chamber. The chamber may be filled completely with the beverages by opening the vent valve 53 at the top and permitting the air or gas collected in the chamber to escape. Thus, when the faucet 48 is opened one draws from solid beverage and the danger of wild or unduly effervescent beverage is avoided. The bevearge flows out the exit tube 46 which draws it from about the middle of the chamber, thereby, avoiding any sediment which may have collected at the bottom of the chamber or any gas which may have collected at the top of the chamber. Such excess gas collecting within the chamber may be vented at any time through the valve provided. It should be noted that in the preferred form shown, a complete bar installation is presented with all the requisites for service. In the cold storage compartment 2, the refrigerated air is also driven by the fan 14 through the duct and it returns through the main cooling compartment 4 in to the blower compartment again. Above the blower compartment 12 the ice cubes are made and the ingredient bottles 32 protruding from the top of the bar into that compartment are kept at a low temperature. After closing hours, the refrigerating apparatus is turned off and the grid unit is thereby defrosted. A tray to catch the melted frost or a direct run-off line may be used to dispose of the water. The temperature of the grid unit itself is controlled by the conventional pressure control of the compressor.

The invention need not be practiced with the chamber 42, but any kind of tapping system may be used. Nor need the invention be practiced by the use of an enclosed bar 1; the conventional bar may be used and the enclosure for circulating the refrigerated air may be provided by a canvas cover or any such similar material acting as an enclosure.

Nor is it necessary for the cooling chamber to be made as heretofore described. It may be a box or compartment separate and apart from the bar and placed under the bar or near it, or in another room or in the cellar.

Since the cooling takes places in an enclosed space, gaseous material with a high coefficient of thermal conductivity such as carbon dioxide may be introduced within the enclosed space, or some such other gaseous matter of high thermal conductivity, the purpose being to facilitate the heat exchange.

It will thus be seen that the objects of this invention aforesaid and many other objects and advantages are attained through the structure illustrated, and the inventor intends his drawing and specifications to be mere illustrations, since many variations and alterations of the specific form shown my be made without departing from the spirit of the invention.

I claim:

1. A device for conditioning a beverage in its transportation container including an insulated cabinet, a door in the cabinet, a beverage transportation container positioned within the cabinet, refrigerating means, means for projecting gaseous matter in heat exchange relation with the refrigerating means and then the transportation container, supporting means for the transportation container so designed and constructed as to allow a portion of the projected gaseous matter to pass beneath the transportation container, said supporting means further including a container for a liquid adapted to retain it in heat exchange relation with the transportation container.

2. A device for conditioning a beverage in its transportation container including an insulated cabinet, a door in the cabinet, a beverage transportation container positioned within the cabinet, supporting means for the transportation container so designed and constructed as to allow gaseous matter to pass beneath the transportation container and further including a container for a liquid adapted to retain the liquid in heat exchange relation with the transportation container, refrigerating means, means for projecting gaseous matter in heat exchange relation with the refrigerating means and then the lower portion of transportation container and also beneath the transportation container, and thermostatic means for controlling the temperature.

ALAN L. HANN.